S. G. MILLER.
VEHICLE SPRING CONSTRUCTION.
APPLICATION FILED MAR. 1, 1918.
1,324,974.
Patented Dec. 16, 1919.
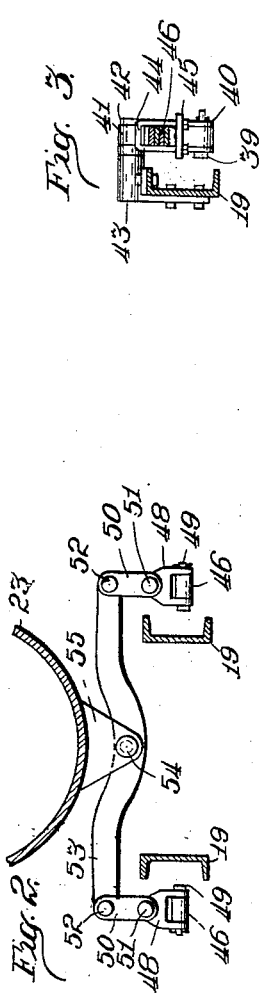
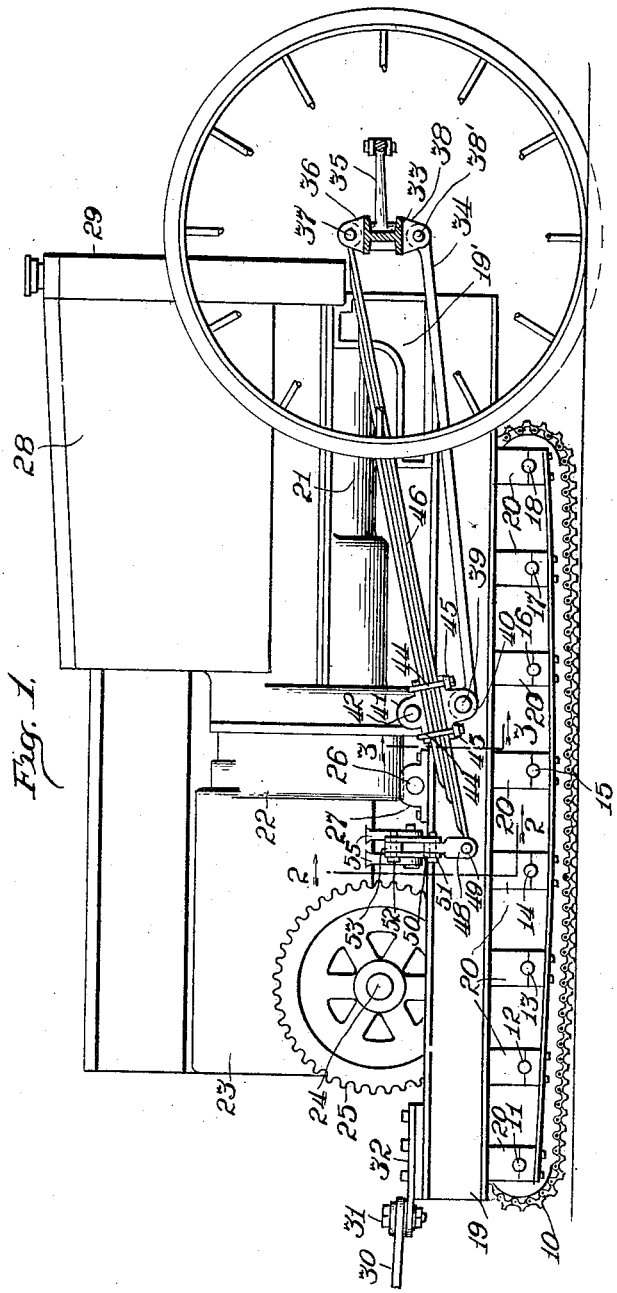
Inventor
Stanley G. Miller
By Arthur T. Sprinkle
Attorney

UNITED STATES PATENT OFFICE.

STANLEY G. MILLER, OF ST. PAUL, MINNESOTA, ASSIGNOR TO THE GENERAL MACHINERY AND INVESTMENT COMPANY, OF ST. PAUL, MINNESOTA, A CORPORATION OF MINNESOTA.

VEHICLE SPRING CONSTRUCTION.

1,324,974.                Specification of Letters Patent.    Patented Dec. 16, 1919.

Application filed March 1, 1918.  Serial No. 219,772.

*To all whom it may concern:*

Be it known that I, STANLEY G. MILLER, a citizen of the United States, residing at St. Paul, in the county of Ramsey and State of Minnesota, have invented certain new and useful Improvements in Vehicle Spring Constructions, of which the following is a specification.

The invention relates to spring constructions interposed between frames and axles of vehicles, and the primary object of the invention is the provision of resilient supports interposed between the main frame and the axles which carry either the steering or propelling or both steering and propelling wheels of the vehicle. The invention is applicable to the numerous types of vehicles, motor driven, being particularly adapted to farm tractors of the type known as track laying machines, which are machines in which an endless track forms a part of the machine and a portion of this track is continuously laid on the ground or other surface which the machine traverses.

Other objects of the invention will appear from the following specification, reference being had to the drawing all of which is directed to the preferred embodiment of the invention.

In the said drawing Figure 1 is a side elevation of a motor driven machine or tractor to which the invention is applied. In this view non-essential parts of the machine are omitted for the sake of clearness as is a portion of one of the front or steering wheels while the steering axle is shown in cross section.

Fig. 2 is a broken detail partly in section through the transmission case and the main side frames of the machine illustrating the manner of securement of the spring construction interposed between the motor frame and the front axle the view being taken on line 2—2 Fig. 1.

Fig. 3 is a broken detail view partly in section showing the manner of attachment of the spring construction on each side of the machine to the main frame of the tractor, being taken on line 3—3 Fig. 1.

The tractor to which the invention is applied is of the track laying or beltrail type, the composite beltrail being designated by the reference character 10 in the drawing and consisting of a plurality of pallets hinged together forming an integral belt or endless track of some width on which the supporting wheels of the main frame rest. In the embodiment of the invention as illustrated in Fig. 1 this type of beltrail tractor track is shown supported upon series of wheels at each side of the track, the axles of which are designated by the reference characters 11 to 18 inclusive, the axles 11 and 18 respectively supporting the terminal of the flexible beltrail and the axles 12 to 17 inclusive carrying the beltrail supporting wheels are preferably journaled on the main frame 19 or suitable bearing brackets thereon as indicated at 20 so that the lower run of the beltrail or flexible track 10 will be on the arc of a circle of very large diameter, resulting in the lower run of the beltrail being depressed below the terminal portions thereof just enough to cause the major portion of the weight of the machine to be carried near the middle of the beltrail and the terminal portions to rest more lightly on the ground.

The tractor main frame is made up of the two channel side bars 19, each of which carries at its forward extremity the brackets 19' extending upwardly and supporting the forward extremity of the motor frame or casing indicated by the reference character 21. The casing 21 is shown in the drawing as having a part 22 carrying a clutch and a rear compartment 23, which carries suitable transmission mechanism for imparting movement to the driving axle 24 having the large driving gears 25 on each side thereof meshing with suitable teeth or projections on the outer periphery of the beltrail on its upper run. The combined engine clutch and transmission casing may be supported at the rear by the cross shaft 26 journaled in the suitable bearings 27 on each of the side rails 19 of the main frame, the shaft 26 being secured to the under side of the transmission casing or the clutch casing as indicated in Fig. 1. The hood covering the upper parts of the motor is indicated by the reference character 28 and the radiator at 29. The reference character 30 indicates a link pivotally connected at 31 to draw bar 32 on the tractor frame. This draft mechanism may be employed in hitching the tractor to a plow or other machine or devices to be hauled.

The parts of the tractor thus far described are of the conventional form and in order to steer or guide the tractor the front axle shown in section as designated by the reference character 33 is attached to the tractor by radius rods at each side of the main frame 19, one of such rods being designated by the reference character 34 in Fig. 1.

In a tractor of the beltrail type in which the propelling power is applied to the beltrail 10 it is a difficult matter to retain the steering wheels upon the ground or surface over which the machine is to be driven with just the required degree of pressure to be able to properly guide the machine and at the same time avoid carrying enough weight on the steering wheels to injure the tractive power of the driving means. This necessitates that the steering wheels and the axles carrying them shall be mounted to have great freedom of movement in relation to the tractor main frame. It is the chief object of the invention to secure this improved flexible relation between the steering wheels and the tractor main frame. In the drawing in Fig. 1 is shown the rim or felly of one of the steering wheels and in the same view while the axle is in section one of the steering knuckles on the opposite side of the machine appears and is designated by the reference character 35. The axle 33 has spaced lugs projecting from the upper and lower sides thereof as indicated at 36 and 38, Fig. 1. These lugs are in pairs and the radius rods 34 at their forward extremities are connected between the pairs of lugs 38 by the pivot pins 38'. The radius rods 34 are pivotally connected at 39 to plate 40 between spaced depending ears thereon and the plates 40 are rigidly clamped to coöperating similar members 41 which are likewise mounted on the pivot pins 42 secured in bracket 43 attached by bolts or other suitable securing means to the main frame side members 19, as indicated in Fig. 3. The clamping member 40 and 41 are shaped with coöperating frame portions adapted to clamp between them the leaves of a cantaliver spring, this clamping together of the parts being accomplished by means of the U bolts 44, (see Figs. 1 and 3) and their coöperating plates 45 and nuts which are adjustably secured on the threaded ends of the U bolts. The cantaliver spring designated by the reference character 46 is made up of a plurality of leaves, the lowermost one of which is formed with suitable eyes for securement to spring shackles or hangers at its extremities, the securement at the forward ends being between the ears 36, heretofore referred to, by the shackle bolts 37. At their rearmost extremities, the eyes of the springs 46 are secured between the branches of the shackle members 48 by bolts 49.

A universal connection between the spring and its hanger at the rear is obtained by securing the shackles 48 between spaced links 50 by means of pivot 51, the upper extremities of the links 50 being pivotally secured by pins 52 to the outer extremities of an equalizing bar 53, said pins being passed through perforations therein. The equalizing bar 53 is constructed so as to have sufficient strength to withstand any strains placed upon it by the steering wheels and the axle carrying the same through the intermediary of the pivotally mounted springs 46 and the connections described, and this bar is secured between its ends along the median line of the machine by means of a pivot pin 54 passing through a perforation near the center of the bar, the pin 54 being secured between the spaced depending ears 55 constructed preferably integrally with the bottom of the engine case or as shown in the preferred embodiment, with the bottom of the engine case extended rearwardly and forming a part of the transmission case shown as formed integrally with the engine case or since the engine casing is substantially fixedly secured to the beltrail frame I may advantageously mount the pivotal connection for the equalizing bar 53 upon some portion of the frame part rigid with the side bars 19 of the beltrail frame instead of upon the underside of the engine casing as illustrated.

The operation of the steering device will be apparent from the description, for it will be seen that with the parts of the spring construction coöperating with the steering wheels and axle properly proportioned, any movement of one of the wheels and consequent movement of the axle at that end out of the normal position, will result in transferring the strain upon the spring and axle and the wheel at the opposite end of the steering axle. For example, if the steering wheel shown in the drawing in Fig. 1 as on the near side of the machine shall be raised several inches above its normal position which is approximately on the level with the bottom of the lower run of the beltrail track 10, such upward movement of the wheel will elevate the axle at the adjacent end and will carry upwardly the forward end of the radius rod 34 and the adjacent spring 46, resulting in a depression of the rearward end of this spring due to its pivotal connection with the tractor main frame 19, at the same time carrying downwardly the adjacent end of the cross lever 53 and elevating the opposite end of the said lever 53 on the reverse side of the machine. Obviously the elevation of the opposite end of the lever 53 which is connected through the universal link mechanism with the rearward end of the spring on that side of the machine will elevate the rear end of the spring on the reverse side of the machine with the result that an increased downward pressure will be placed upon the steering wheel on the reverse side of the machine. Now when it is borne in mind that the function of the steering wheels is not to carry any more of the weight of the machine than is necessary to enable them to properly steer it, it will be seen that it is desirable to employ the compensating means of this invention to insure that there will be practically a uniform amount of steering wheel pressure exerted upon the surface over which the machine is passing by the steering wheels at all times, regardless of the condition of the ground or surface over which the machine is passing. The compensating connection between the two springs connected with the steering axle at each side of the machine insures a degree of flexibility of the steering axle in relation to the main frame not hitherto attainable by known means.

In order that the invention might be understood the details of the preferred embodiment have been illustrated and described but it is not desired to be limited to the details shown and what I claim is:

1. The combination with a motor driven vehicle having a main frame, power operated traction devices on the main frame contacting with the ground or surface over which the tractor is adapted to be driven, a steering device therefore comprising an axle movably mounted in relation to the said power operated traction devices and said main frame, steering wheels carried by the said axle, two spring devices secured to the said axle near the opposite extremities thereof and to the frame carrying the power operated traction devices, each of said spring devices comprising a plurality of leaf springs and each of the spring devices being pivoted to the said frame intermediate the ends thereof, a compensating lever pivotally secured to a part rigid with the frame carrying the power operated traction devices, and universal connections between the free ends of each of the spring devices and the said pivoted compensating lever.

2. The combination with a motor driven vehicle having a main frame, power operated traction devices on the main frame contacting with the ground or surface over which the tractor is adapted to be driven, a steering device therefor comprising an axle movably mounted in relation to the said power operated traction devices and the said main frame, steering wheels carried by the said axle, two spring devices secured to the said axle near the opposite extremities thereof and to the frame carrying the power operated traction devices, each of said spring devices comprising a plurality of leaf springs and each of the spring devices being pivoted to the said frame intermediate the ends thereof, a compensating lever pivotally secured to a part rigid with the frame carrying the power operated traction devices and flexible connections between the free ends of each of the spring devices and the said pivoted compensating lever.

3. The combination with a motor driven vehicle having an endless belt traction device, a main frame, a steering frame flexibly connected to have movement in relation to the main frame, spring means interposed between the main frame and the steering frame comprising two leaf springs pivotally connected to the main frame intermediate their extremities, one of the ends of each of the said springs being connected to the steering frame, and a compensating lever pivoted to the main frame and having pivotal connections with each of the free ends of the said pivotally mounted springs.

4. The combination with a motor driven vehicle having power operated traction devices contacting with the ground or surface over which the tractor is adapted to be driven, the said power operated traction devices being in the form of a flexible track, a main frame carried by the said flexible track, a steering frame flexibly connected to the main frame, resilient means interposed between the main frame and each side of the steering frame, and compensating means whereby movement of the spring means on one side of the steering frame is imparted to the spring means on the other side of the steering frame.

5. The combination with a motor driven vehicle having a main frame, a flexible track carrying the main frame, a motor on the main frame, means imparting movement from the motor to the flexible track, a steering frame movably connected with the main frame, and spring means for controlling the relation of the steering frame to the main frame comprising two separated spring devices connected to the steering frame on each side of the main frame and compensating devices for imparting movements of one side of the steering frame through the said spring devices to the opposite side of the steering frame.

6. The combination with a motor driven vehicle having power operated traction devices contacting with the ground or surface over which the tractor is adapted to be driven, a main frame, a steering frame movably connected with the main frame, and spring devices interposed between the steering frame and the main frame comprising two separated elongated springs pivotally connected intermediate their ends with the main frame and secured at one extremity to separated portions of the steering frame, a compensating lever pivotally connected with the main frame, and universal connections between the extremities of the said compensating lever and the free ends of the two said elongated springs.

7. The combination with a motor driven vehicle having power operated traction devices contacting with the ground or surface over which the tractor is adapted to be driven, a main frame, a steering frame flexibly connected with the main frame, a plurality of radius rods connected with the steering frame and the main frame allowing the former to move in relation to the latter, a pair of elongated springs pivotally connected to the main frame intermediate their extremities and each being secured at one extremity to the steering frame and at their free extremities to a compensating device whereby a movement of the steering frame in relation to the main frame on one side will act upon the adjacent spring through the said compensating device and react upon the spring connected with the opposite side of the steering frame.

8. The combination in a motor driven vehicle of a main frame, power operated traction devices carried by the main frame and comprising a plurality of separated movable members adapted to support the main frame of the vehicle at separated points longitudinally thereof, a steering frame flexibly connected with the main frame and a power operated traction device thereon, a plurality of radius rods connected with the steering frame and the main frame, whereby the steering frame may move independently of the main frame, a pair of elongated springs pivotally connected to the main frame intermediate their extremities, and each being secured at one extremity to the steering frame and at the free extremities to a compensating device whereby a movement of the steering frame on one side in relation to the main frame will act upon the adjacent spring through said compensating device and reacting upon the spring connected with the opposite side of the steering frame.

9. The combination in a motor driven vehicle having a main frame, of an axle, wheels at the extremities of said axle, a pair of elongated springs, each of said springs being connected adjacent one extremity thereof with said axle and being pivotally connected intermediate their extremities with the main frame, an equalizing bar extending transversely of and with the main frame, and universal connections between the free ends of the universal bar and each of the extremities of the elongated springs at the ends thereof opposite their respective connections with the axle, said universal connections being carried by said bar and spring and being disassociated from the main frame.

10. The combination in a motor driven vehicle having a main frame, of an axle, wheels at the extremities of said axle, a pair of elongated springs, each of said springs being secured to said axle and being pivotally connected to the main frame, an equalizing bar extending transversely of and having pivotal connection between its extremities with the main frame, and universal connections between said elongated springs and the extremities of said equalizing bar, said universal connections being carried by said bar and spring and disassociated from the main frame.

In testimony whereof I have signed my name to this specification, in the presence of two subscribing witnesses, on this 16th day of February A. D. 1918.

STANLEY G. MILLER.

Witnesses:
  G. WATERS,
  C. A. KELLETT.